United States Patent [19]
Droux et al.

[11] 3,953,888
[45] Apr. 27, 1976

[54] DEVICE FOR READING A BINARY-CODED MAGNETIC RECORDING

[75] Inventors: Jacques Droux, Paris; Michel Audebert, Bourg-la-Reine; Gérard Millair, Noisy-le-Sec, all of France

[73] Assignee: Compagnie Honeywell Bull (Societe Anonyme), Paris, France

[22] Filed: Sept. 18, 1974

[21] Appl. No.: 507,136

[30] Foreign Application Priority Data
Sept. 19, 1973 France .............................. 73.33582

[52] U.S. Cl. ................................... 360/46; 360/43
[51] Int. Cl.² ........................................... G11B 5/09
[58] Field of Search ............... 360/43, 46, 65, 25, 360/31

[56] References Cited
UNITED STATES PATENTS

| | | |
|---|---|---|
| 2,868,890 | 1/1959 | Camras .............................. 360/25 |
| 3,007,010 | 10/1961 | Erath ................................ 360/65 |
| 3,265,818 | 8/1966 | Goossen et al. ..................... 360/65 |
| 3,441,921 | 4/1969 | Jacoby et al. ...................... 360/65 |
| 3,568,174 | 3/1971 | Jacoby et al. ...................... 360/65 |
| 3,686,682 | 8/1972 | Behr et al. ......................... 360/25 |
| 3,781,488 | 12/1973 | Byers ................................ 360/65 |
| 3,797,038 | 3/1974 | Brander ............................. 360/46 |

*Primary Examiner*—Vincent P. Canney
*Attorney, Agent, or Firm*—Lowe, King, Price & Markva

[57] ABSTRACT

A device for reading a binary coded magnetic recording. The device includes a reading head producing a reading signal, a digitizer, and a mechanism for modulating the reading signal to substantially reduce distortion caused by the physical characteristics of the reading head and magnetic recording.

16 Claims, 21 Drawing Figures

Fig. 7

Fig. 8

DEVICE FOR READING A BINARY-CODED MAGNETIC RECORDING

BACKGROUND OF THE INVENTION

The present invention relates generally to a device for reading a binary-coded magnetic recording and more particularly to a mechanism for modulating the signal produced by a magnetic recording reading head to substantially reduce distortion.

The presently known devices for reading a magnetic recording coded in binary language generally include a reading head, a differentiator operating on the signal provided by the reading head, a digitizer and, in most cases, a preamplifier and amplifier. Thus, the reading signal is amplified, differentiated to improve its shape and digitized to reproduce the 0 and 1 binary code recorded on the recording support.

On the magnetic recording, the binary 0 and 1 are represented by different frequencies of magnetic flux polarity reversals. For example, the 0 can be associated with a reversal frequency of one half of that corresponding to the 1. Thus, the magnetic domain of the support associated with a 0 has, with respect to the reading head, a length double that of the magnetic domain corresponding to a 1. Theoretically, the 0's and 1's should, therefore, be clearly distinguishable since one is represented by pulses of duration different, e.g., double, that of the other.

However, in reality the reading signal provided by the reading head is highly distorted in amplitude and phase. This is due to the inherent characteristics of the reading head and magnetic support, as well as the distance which separates them. As a result, pulses representing 0 and 1 are often confused, such that the output signal of the digitizer contains numerous errors.

SUMMARY OF THE INVENTION

In a principal aspect, the present invention is an apparatus for reading a magnetic recording coded in binary language, wherein the 0 and 1 are represented by different frequencies of magnetic flux polarity reversals. The present invention comprises a magnetic reading head, a digitizer and, between the head and digitizer, a device for amplitude correction of the signal provided by the reading head.

The amplitude correction device presents an attenuation/frequency characteristic substantially the inverse of that of the reading head. Thus, the input signal to the digitizer is corrected in amplitude to substantially avoid distortion or deformation caused by the reading head.

Preferably the amplitude correction device includes a plurality of cascaded corrector amplifiers having the desired combined transfer function. Each corrector amplifier comprises an operational amplifier and a pair of filters. One of the filters is mounted in the input circuit of the operational amplifier, while the other filter is mounted in parallel across the operational amplifier.

To determine the attenuation/frequency characteristic of the reading head, a known sequence of digits (a test code) is read and the output signal of the reading head is studied. For this purpose, the signal read by the head is photographed on an oscilloscope. From the photograph, a cycle or half-cycle of the reading signal is divided into a certain number of equal segments and the ordinates are measured. The ordinates correspond to the abscissae bounding the segments.

From these measurements, the sine and cosine components of a certain number of harmonics of the reading signal are determined by a known mathematical method. The modulus of each harmonic is also determined. Moreover, the attenuation of each harmonic with respect to the corresponding harmonic of the test signal is calculated. From these calculations, the attenuation characteristic of the reading head and, consequently, the characteristic of the amplitude correction device are determined.

In another embodiment, and to further improve the signal provided by the reading head, the present invention includes, downstream of the amplitude correction device, a phase correction device enabling the different harmonics to be put in phase. The phase correction device comprises an all-pass filter of the second order. Such a filter includes two circuit arms mounted in anti-parallel, each arm comprising a resistor, a capacitor and an inductor.

To determine the phase/frequency characteristic of the phase correction device, the test code signal is again subjected to a harmonic analysis similar to that described above and the phase lag of a certain number of harmonics is determined with respect to the first harmonic. A phase distortion curve is obtained by plotting the lag and order of the harmonic on two right angle axes. The response curve of the phase correction device is substantially the inverse of this phase distortion curve.

Preferably, the test codes include binary sequences known to cause errors in the reading devices. Corrected for these particularly difficult test codes, the reading device will be substantially more accurate.

It it thus an object of the present invention to provide a reading device for a binary coded magnetic recording wherein distortion of the reading signal is substantially minimized.

It is a further object of the present invention to provide a reading device including a mechanism for modulating the reading signal to substantially eliminate distortion caused by the reading head.

It is a further object of the present invention to provide an amplitude-phase modulation mechanism for a magnetic recording reading apparatus whereby the reading signal is corrected in amplitude and phase to substantially avoid errors in reproduction of the recorded binary code.

These and other objects, features and advantages of the present invention will become apparent in the following detailed description.

BRIEF DESCRIPTION OF THE DRAWING

A preferred embodiment of the present invention will be described in detail with reference to the drawing wherein.

DETAILED DESCRIPTION OF THE PREFERRED EMBODIMENT

In the FIGURES, similar references indicate similar elements.

Figure 1:
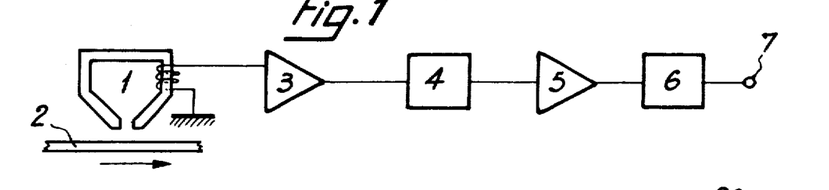
FIG. 1 is a schematic diagram of a known device for reading a magnetic recording coded in binary language.

A known reading device for magnetic recording is shown in FIG. 1 and comprises a reading head 1 for a recording carried by a record medium 2 (for example, a magnetic disc or tape) passing close to the head 1, a preamplifier 3 for amplifying the reading signal provided by the head 1, a differentiator 4, an amplifier 5 and finally a digitizer 6, which restores the amplified, differentiated signal to digital form.

The magnetic recording carried by the medium 2 is produced in binary form such that the binary 0 is represented by a first frequency of reversals of flux polarity while the binary 1 is represented by a second frequency. The second frequency, in this instance, is double the first.

Figure 2:
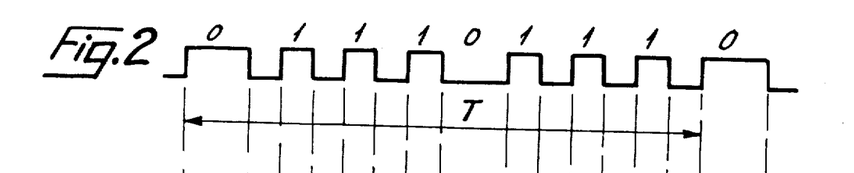
FIG. 2 illustrates a sequence of digits particularly suited for use as a test code.
Figure 3:
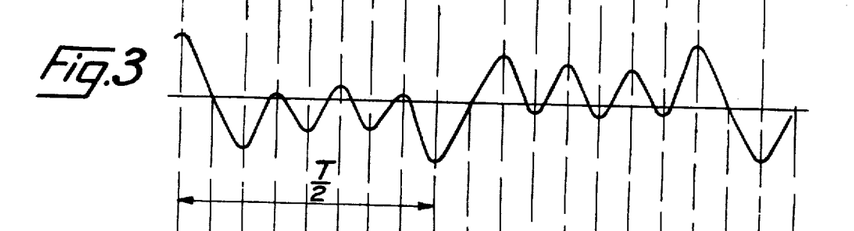
FIG. 3 illustrates the reading signal produced by the reading head of the device shown in FIG. 1 in response to the test code shown in FIG. 2.

In response to the test code shown in FIG. 2, i.e., a "011101110" code, the reading head 1 produces the signal shown in FIG. 3. Due to the technical characteristics of the reading head 1 and medium 2, as well as the distance which separates them, the signal provided by the head 1 is distorted and deformed in phase and amplitude. As a result, the signal at the output 7 of the digitalizer 6, in many instances, will contain errors when compared with the recorded code shown in FIG. 2.

Figure 4:
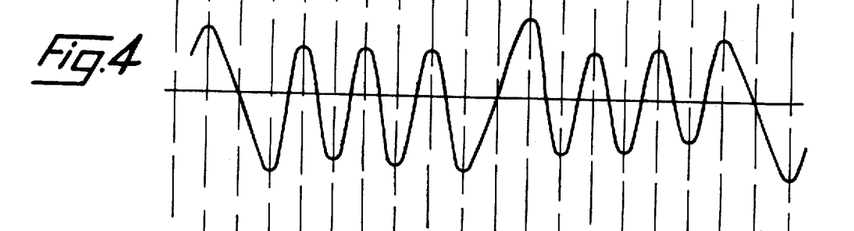
FIG. 4 shows the reading signal of FIG. 3 after passing through a differentiator.

That is, the deformations are such that a long pulse (0) can no longer be distinguished from a short pulse (1), and consequently information is lost. The loss is inversely proportional to the strength of the signal, i.e., the weaker the amplitude of the signal, the greater the loss. Despite the differentiator 4 which restores amplitude to the reading signal, the signal provided to the digitizer 6 is sufficiently deformed, such that the digitizer 6 provides at its output 7 an incorrect digital signal. FIG. 4 illustrates the signal produced by the head 1 after treatment by the preamplifier 3, differentiator 4 and amplifier 5.

Figure 5:
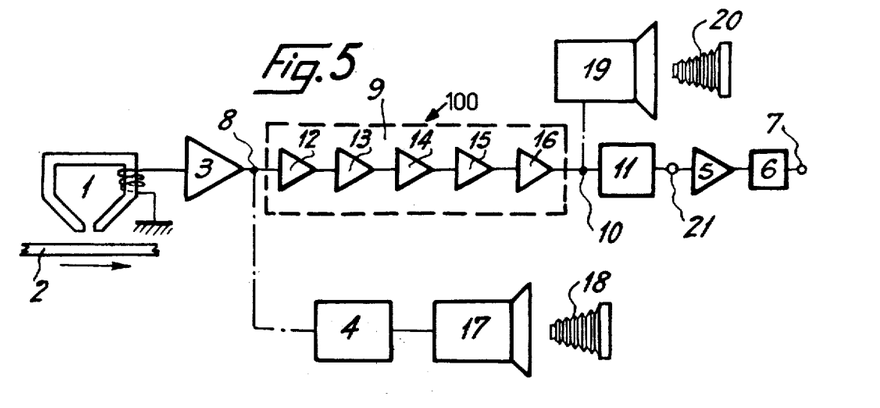
FIG. 5 is a schematic diagram of a preferred embodiment of the present invention for reading a magnetic recording coded in binary language.

A preferred embodiment of the present invention is shown in FIG. 5 and generally designated as a reading device 100. The reading device 100 substantially avoids the distortion problem discussed above and exhibited by the presently known reading device.

In the preferred embodiment shown in FIG. 5, the head 1 reads the recorded code on the medium 2 and sends its signal to the preamplifier 3. The output 8 of the preamplifier 3 is connected to a device 9 for amplitude correction of the signal. The output 10 of the amplitude correction device 9 is joined to the input of a device 11 for phase correction of the signal. Finally, the device 11 is joined to the output terminal 7 through the amplifier 5 and digitizer 6. As will be seen later, the amplitude correction device 9 is formed by the mounting in cascade of a plurality (five in the example chosen) of corrector amplifiers 12, 13, 14, 15 and 16, defining a product transfer function which properly corrects the amplitude of the reading signal. Similarly the phase correction device 11 is formed by at least one filter.

In order to determine the technical characteristics of the device 9, the difficult test code, shown in FIG. 2, is recorded for reading by the reading head 1. The signal at the output 8 of the preamplifier 3 is transmitted preferably through a differentiator 4a to a display device 17, e.g., a cathode ray oscilloscope with associated photographic apparatus 18. Analysis of this signal enables the characteristics of the device 9 to be determined in order that the reading signal can be amplitude corrected.

In similar fashion the reading signal corrected for amplitude is taken off at the output 10 of the device 9 and transmitted to a display device 19, e.g., a cathode ray oscilloscope having a photographic apparatus 20. Analysis of the signal at the output 10, as discussed in detail below, enables the necessary characteristics of the device 11 to be determined in order that the reading signal, already corrected for amplitude, can be corrected for phase.

The devices 9 and 11 thus determined, which correct the reading of a particularly difficult test code, are therefore capable of correcting the reading of running binary information recorded on the medium 2. Consequently the apparatus 100, as a whole, provides a reading signal at its output 7, which accurately interprets the binary code recorded on the support 2.

Determination of the frequency characteristics of the amplitude and phase correction devices 9, 11, respectively, will now be described by way of example. For this purpose, the binary test code shown in FIG. 2, is recorded and read by the head 1. The corresponding signal delivered by the head 1 is amplified by the preamplifier 3, differentiated by the differentiator 4a and photographed by apparatus 18. A curve similar to that shown in FIG. 4 is obtained. This photograph is then enlarged and the ordinates of the curve are measured for different abscissae.

Figure 6:
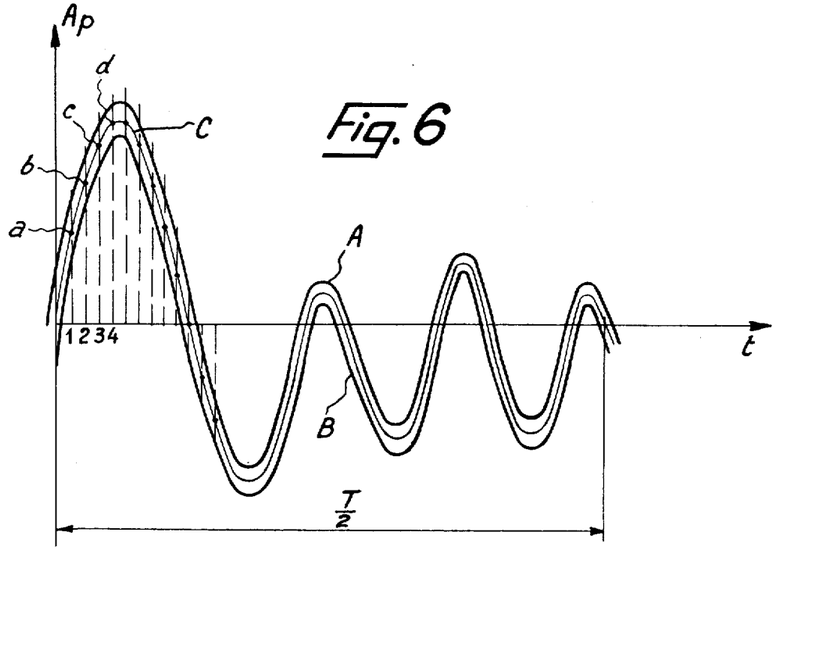
FIG. 6 illustrates the harmonic analysis of the signal shown in FIG. 4.

It will be observed that the signal must be analyzed only over a half-cycle T/2. Moreover, due to noise from the electronic apparatus, the enlarged curve appears as a relatively thick line bounded by two extreme lines A and B, as shown in FIG. 6.

The half-cycle T/2 of the signal is divided into a predetermined number of equal segments (for example, 36) marked by the abscissae 1, 2, 3 . . . For each of these abscissae the corresponding ordinate $a, b, c, d$ . . . is measured. The ordinates represent a curve C passing equidistant between the lines A and B.

Form the measurement of these ordinates and a known mathematical method of approximation of a function by a limited FOURIER development, the sine and cosine components of a certain number (for example, 35) of harmonics of the curve C are determined. Likewise the direction of departure, modulus and lag or phase shift of the harmonics are calculated with respect to the fundamental harmonic. Attenuation of each harmonic with respect to the corresponding harmonic of the test signal (FIG. 2) is also determined by calculation. It should be noted that the test signal shown in FIG. 2 includes only odd order hamonics.

Figure 7:
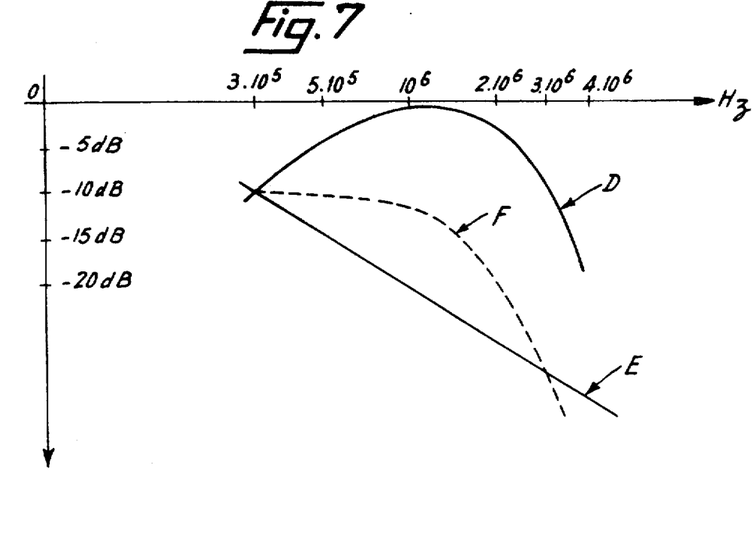
FIG. 7 is an attenuation curve for the reading head shown in FIGS. 1 and 5.

A curve of overall attenuation is then produced. The curve for this example is shown in FIG. 7 and designated D. However, the curve C shown in FIG. 6 underwent differentiation to facilitate the harmonic analysis of the high frequencies (up to 4 MHz, for example) and to improve the accuracy of the analysis. To determine the attenuation curve of the head 1 and preamplifier 3, it is, therefore, necessary to take this differentiation (6dB/ octave) into account. The attenuation of the differentiator 4a is represented by the straight line E in FIG. 7. The curve D and straight line E are combined, i.e., subtracted, to obtain the attenuation curve F of the head 1 and preamplifier 3.

Figure 8:
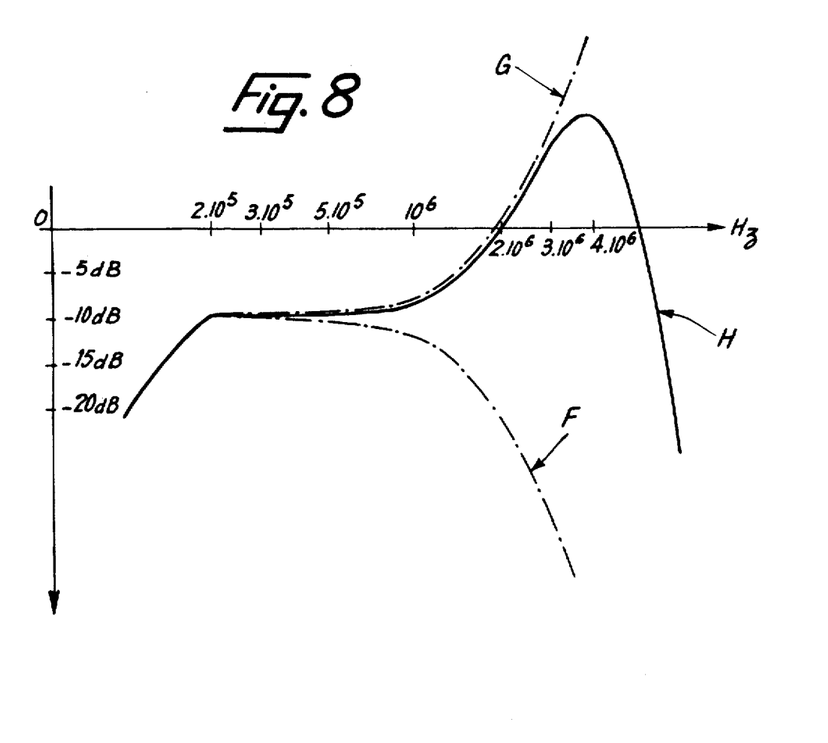
FIG. 8 illustrates the frequency response of an amplitude correction device for use in the preferred embodiment shown in FIG. 5.

The amplitude correction device 9 must have a frequency characteristic or factor which is the inverse of the attenuation curve F. This characteristic is shown in FIG. 8 and designated G. However, in the low-frequency portion, it is useless for the amplitude correction device 9 to allow a continuous current flow. Thus, provided the fundamental frequency of the base signal (312 KHz in the example represented in FIG. 6) is not distorted, the device 9 can have a low-frequency cut-off. As shown in FIG. 8, a low-frequency cut-off is chosen at approximately 200 KHz. The slope of the drop is 12 dB/octave to ensure good protection against industrial interference (approximately 50 Hz).

Additionally, it is practically useless to maintain high frequencies, e.g., above approximately 4 MHz. That is, suppression of harmonics of order higher than 13 (about 4 MHz) has almost no effect on the shape of the signal. Thus, the frequency response can drop off above 4 MHz. Indeed, the drop must be as steep as possible to substantially reduce high-frequency noise. Consequently, the preferred frequency characteristic of the device 9 is represented by the curve H in FIG. 8.

The characteristic H can be obtained by a series of corrector amplifiers 12, 13, 14, 15 and 16. FIGS. 9a–9f illustrate the frequency characteristics for the amplifiers 12, 13, 14, 15, 16, respectively. In FIGS. 9a–9f, characteristics are indicated asymptotically.

Figures 9A, 9B, 9C:
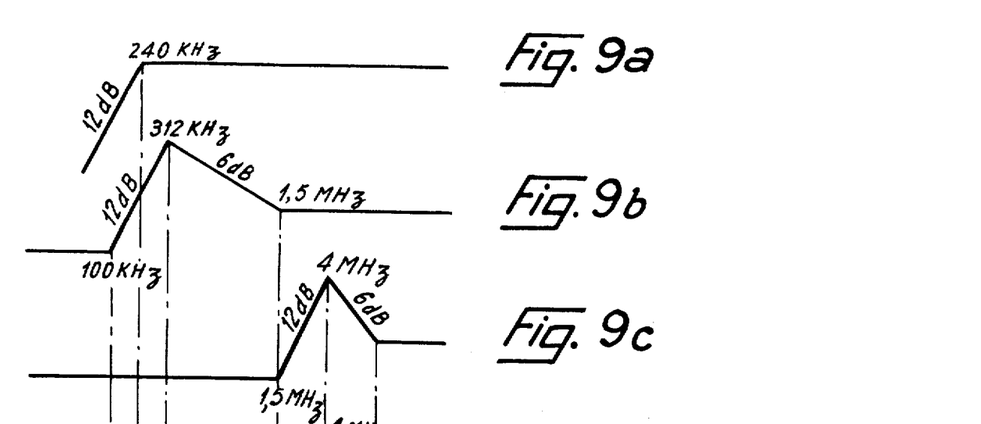
FIGS. 9a to 9e show the individual transfer curves of the various corrector amplifiers comprising the amplitude correction device shown in FIG. 5.
Figure 10:
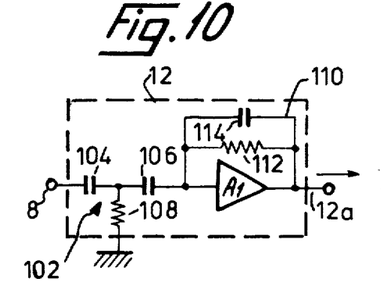
FIGS. 10, 11 and 12 are schematic diagrams of corrector amplifiers for use in the amplitude correction device shown in FIG. 5.

As shown in FIG. 10, the amplifier 12 comprises an operational amplifier A1 with a gain much higher than 1. The input of the operational amplifier A1 is connected to a filter 102 including a pair of capacitors 104, 106 in series and a resistor 108 in shunt. A second filter 110 consisting of a resistor 112 and capacitor 114 is connected in parallel with the amplifier A1. The values of these filter elements are chosen to obtain the transfer function shown in FIG. 9a. The amplifier 12 has an output 12A. The gain of the amplifier 12 is approximately 1 at 1.25 MHz.

Figure 11:
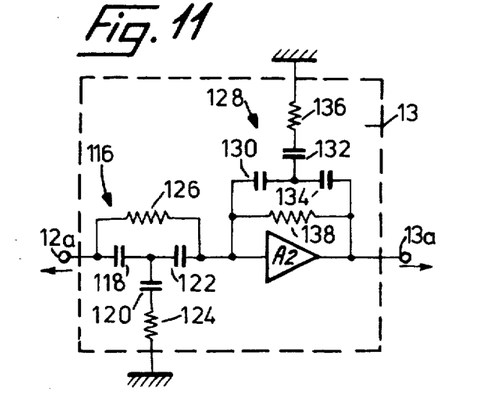

Referring now to FIG. 11, the amplifier 13 comprises an operational amplifier A2 with a gain much higher than 1. At the input of the amplifier A2, there is a filter 116 comprising capacitors 118, 120, 122 and resistors 124, 126, connected as shown. A similar filter 128 comprising capacitors 130, 132, 134 and resistors 136, 138 is connected to the amplifier A2 in parallel. The amplifier 13, having an output 13A, is designed to provide the transfer function shown diagrammatically in FIG. 9b. The gain of the amplifier 13 is approximately 1 at 1.25 MHz.

The structure of amplifier 14 is similar to amplifier 13. The element values, however, are varied to produce the transfer function shown in FIG. 9c and a gain of approximately 2.2 at 1.25 MHz.

Figure 12:
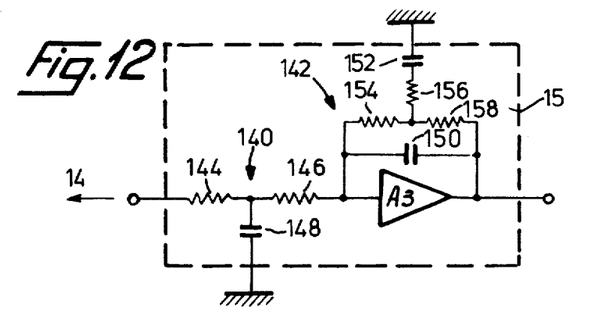

The amplifiers 15 and 16 are also substantially identical, and thus only amplifier 15 will be described. Referring to FIG. 12, the amplifier 15 includes an operational amplifier A3 with a gain very much higher than 1, a first input filter 140 and a second parallel filter 142. The first filter 140 includes a pair of resistors 144, 146 in series and a capacitor 148 in shunt. The second filter 142 comprising capacitors 150, 152 and resistors 154, 156, 158 connected as shown. The corrector amplifiers 15 and 16 exhibit the frequency characteristics shown in FIGS. 9d and 9e, respectively, and a gain of approximately 2.2 at 1.25 MHz.

Figures 9D, 9E:
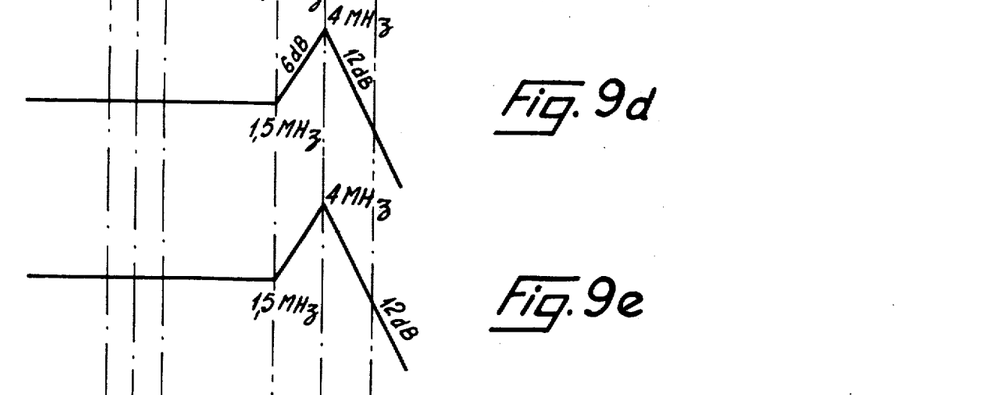
Figure 9F:
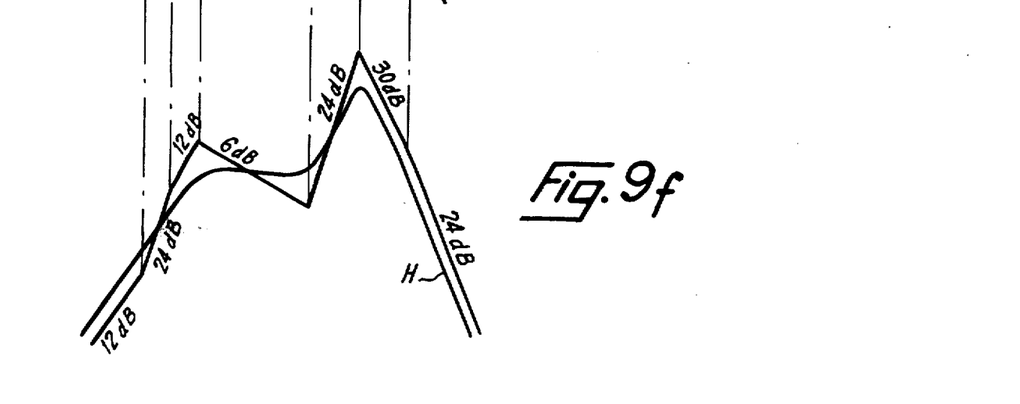
FIG. 9f shows the composite transfer curve of the amplitude correction device, as obtained by combining the curves shown in FIGS. 9a and 9e.

The combination of the transfer functions shown in FIGS. 9a and 9e gives the overall transfer function H, shown in FIG. 9f, for the corrector device 9. The gain of the amplitude correction device 9 is approximately 10 at 1.25 MHz. A non-corrective auxiliary amplifier (not shown) may be associated with the device 9.

Figure 13:
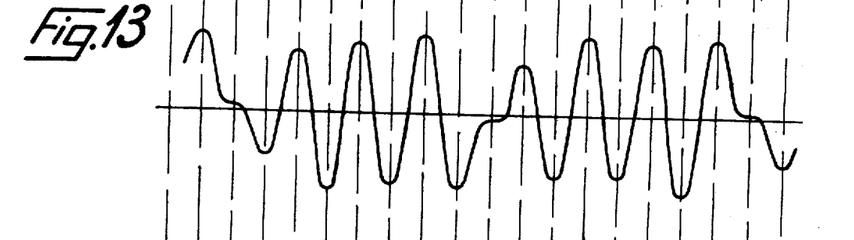
FIG. 13 shows the output of the amplitude correction device in response to the test code.

The amplitude correction device 9 corrects the reading for signal amplitude. FIG. 13 shows the amplitude corrected signal obtained at output 10.

The harmonics of this signal are now analyzed for phase lag with respect to the phase of the first hamonic. For this example, the graph of FIG. 14 shows the phase lag of each hamonic.

Figure 14:
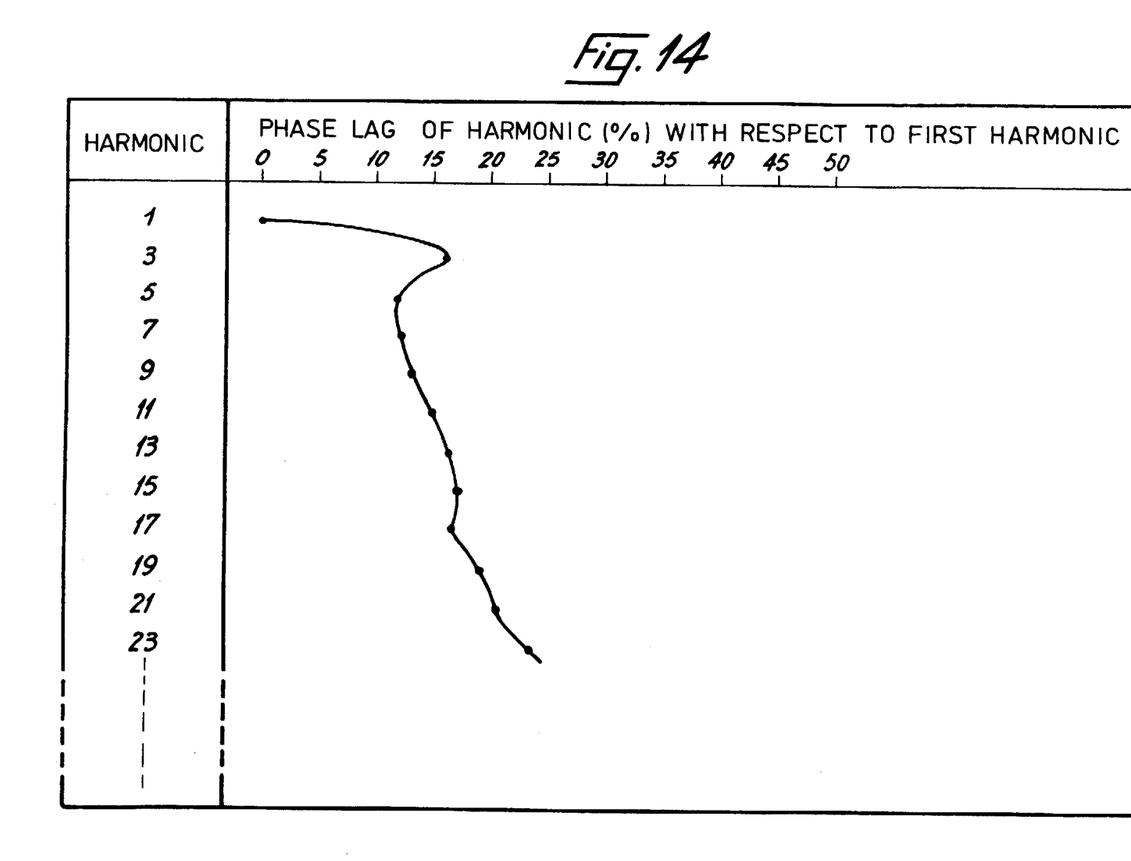
FIG. 14 is a graph illustrating the lag of each harmonic of the output signal shown in FIG. 13.
Figure 15:
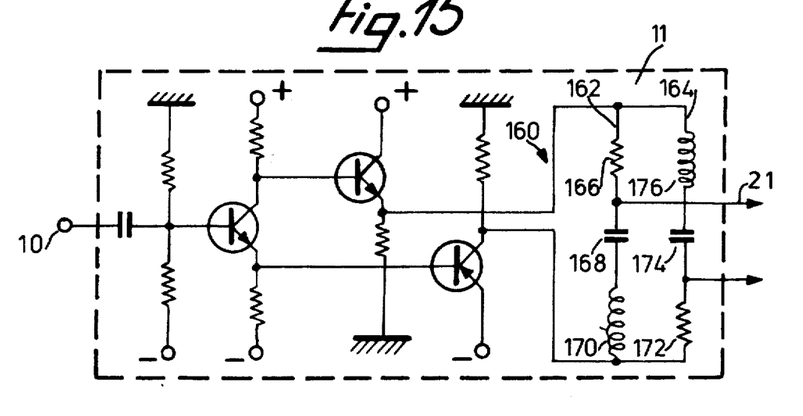
FIG. 15 shows a phase correction device for use in the preferred embodiment shown in FIG. 5.

The phase correction device 11 must exhibit a phase curve the inverse of that shown in FIG. 14 in order that all harmonics be in phase. The phase correction device, shown in FIG. 15, is a second order filter, i.e., an all-pass filter, generally designated 160, which corrects the phase without modifying the amplitude.

The filter 160 comprises two circuit arms 162, 164 mounted in anti-parallel. The arm 162 includes the series combination of resistor 166, capacitor 168 and inductor 170, and the arm 164 includes resistor 172, capacitor 174 and inductor 176 in series.

Figure 16:
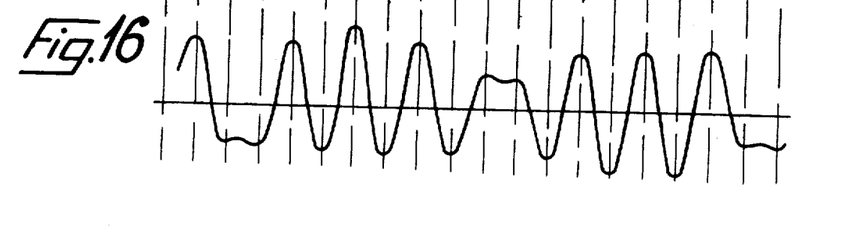
FIG. 16 shows the reading signal at the output of the phase correction device.

At the output 21 of the filter 11, the reading signal corrected for amplitude and phase appears as in FIG. 16. As shown, the "0" is distinctly differentiated from the "1". This signal is transmitted to the amplifier 5 and digitizer 6, such that the signal at the output 7 of the digitizer 6 is an accurate representation of the recorded signal, shown in FIG. 2.

It should be understood that a single preferred embodiment of the present invention has been described, by way of example, and various changes and modifications can be made without departing from the true scope and spirit of the present invention, as defined in the following claims.

What I claim is:

1. A device for reading a magnetic record consisting of successive flux reversals separated from one another by first and second differing time intervals representative of respective states of a binary code, comprising reading head means for generating an analog voltage signal in response to said magnetic record, said analog voltage signal including a fundamental component corresponding with the time intervals and harmonics resulting from frequency-dependent distortions caused by the reading head means transducing the flux reversals into the analog voltage signal, and circuit means for amplifying, processing and digitizing said voltage signal to reproduce said binary code, wherein said circuit means includes a frequency-selective correction means to substantially compensate for the frequency-dependent distortions caused by said reading head means, said correction means including combined amplifier and filter means operative for restoring the proper relationship between the fundamental and at least the lower-order harmonic frequencies in said analog voltage signal which correspond to said first and second time-intervals in said magnetic record.

2. A device according to claim 1, wherein said correction means includes a harmonic-amplitude correcting circuit having an amplitude/frequency transfer function which is substantially the inverse of the attenuation/frequency characteristics of said reading head means.

3. A device according to claim 2 wherein said amplitude correcting circuit includes a plurality of corrector amplifiers connected in cascades and having respective amplitude/frequency transfer functions, the cascaded amplifiers having a combined transfer function that is substantially the inverse of the attenuation/frequency characteristics of said reading head means.

4. A device according to claim 3 wherein each of said corrector amplifiers consists of an operational amplifier and two associated filters, one of the said filters being connected in the input circuit of said operational amplifier, the other of said filters being connected in parallel across the operational amplifier.

5. A device according to claim 1 wherein the reading head means has phase lag/frequency characteristics causing a relative phase shift of the harmonics relative to the fundamental and said correction means includes a harmonic-phase correcting circuit having a phase/frequency transfer function which is substantially the inverse of the phase lag/frequency characteristics of said reading means so that the harmonics and the fundamental are applied to the digitizing means with approximately the same phase.

6. A device according to claim 5 wherein said harmonic-phase correcting circuit includes at least one all-pass filter of the second order.

7. A device according to claim 6 wherein said all-pass filter includes two anti-parallel mounted circuit arms each comprising resistive, inductive and capacitive components.

8. A device according to claim 5 wherein said harmonic-phase correcting circuit is connected to be responsive to an output signal of said harmonic-amplitude correcting circuit.

9. Apparatus for decoding equal length binary data bits recorded on a magnetic medium so that the recorded data bits of a first value have no magnetic flux polarity transitions during one bit length and the recorded data bits of a second value have one magnetic flux polarity transition during one bit length comprising:

a magnetic pickup head for transducing the magnetic flux transitions into a first electrical signal having a substantially continuously varying amplitude with no phase reversals for data bits of the first value and one phase reversal for data bits of the second value, an amplitude correction means responsive to the first electrical signal for deriving a second electrical signal having a waveform with a relatively small slope in the center of each data bit, the amplitude in the center of each bit of the first value in the second signal being approximately at the average value of the waveform, the amplitude in the center of each bit of the second value in the second signal being approximately at a maximum excursion from the average value, and means responsive to the second electrical signal for deriving a binary signal representing the recorded data bits.

10. The apparatus of claim 9, further including phase correcting means responsive to the second electrical signal for deriving a third electrical signal having a waveform wherein the bits of the first value have a substantially constantly changing amplitude during one half of each bit length and a relatively constant amplitude during the other half of each bit length and bits of the second value have a substantially constantly changing amplitude during both halves of each bit length, said binary signal deriving means decoding the third electrical signal into the binary signal.

11. The apparatus of claim 10 wherein said amplitude correction means includes circuit means with a varying amplitude versus frequency response between frequencies $f_{lo}$ and $f_{hi}$, the frequencies $f_{lo}$ and $f_{hi}$ being the frequencies necessary to substantially reconstruct the binary data bits transduced by the magnetic pickup head, said circuit means having amplitude versus frequency slopes of approximately: +24db/octave from $f_{lo}$ to $f_1$, +12db/octave from $f_1$ to $f_2$, −6db/octave from $f_1$ to $f_3$, and +24db/octave from $f_3$ to $f_{hi}$; where $f_1$, $f_2$ and $f_3$ are frequencies between $f_{lo}$ and $f_{hi}$.

12. The apparatus of claim 11 wherein said phase correcting means includes a second order, all pass filter between $f_{lo}$ and $f_{hi}$.

13. The apparatus of claim 11 wherein said amplitude correction means includes means having amplitude versus frequency slopes of: at least +12db/octave for frequencies less than $f_{lo}$ and of at least −12db/octave for frequencies greater than $f_{hi}$.

14. The apparatus of claim 13 wherein said amplitude correction means includes means having an amplitude vs. frequency slope of approximately −30db/octave for frequencies greater than $f_{hi}$ immediately adjacent $f_{hi}$.

15. The apparatus of claim 9 wherein said amplitude corrections means includes circuit means with a varying amplitude versus frequency response between frequencies $f_{lo}$ and $f_{hi}$, the frequencies $f_{lo}$ and $f_{hi}$ being the frequencies necessary to substantially reconstruct the binary data bits transduced by the magnetic pickup head, said circuit means having amplitude versus frequency slopes of approximately: +24db/octave from $f_{lo}$ to $f_1$, +12db/octave from $f_1$ to $f_2$, −6db/octave from $f_1$ to $f_3$, and +24db/octave from $f_3$ to $f_{hi}$; where $f_1$, $f_2$ and $f_3$ are frequencies between $f_{lo}$ and $f_{hi}$.

16. A method of adjusting an amplitude vs. frequency correction means and a phase correcting means connected in cascade with each other and responsive to an electrical signal transduced by a magnetic pickup head means responsive to binary bits recorded on a magnetic medium so that the recorded data bits are correctly encoded by a digitizer responsive to the phase correcting means, said binary bits being recorded on the magnetic medium so that the recorded bits of a first value have a first magnetic flux polarity periodicity during one bit length and the recorded bits of a second value have a second magnetic flux polarity periodicity during one bit length, comprising
  reading a known sequence of binary bits as a test code from the magnetic medium with the magnetic pickup head means so that an electric signal indicative of the known sequence is derived from the pickup head means,
  performing a Fourier analysis on the electrical signal,
  from the Fourier analysis determining the amplitude versus frequency response and the phase lag of harmonics relative to the fundamental of the electrical signal,
  adjusting the amplitude vs. frequency correction means so it has a response that is substantially the inverse of the determined amplitude vs. frequency response, and
  adjusting the phase correction means so that it has a response that is substantially the inverse of the determined phase lag and the phase of the fundamental and the harmonics are substantially the same, said phase correction means being adjusted without substantially modifying the relative amplitudes of the fundamental and the harmonics.

* * * * *